No. 801,791. PATENTED OCT. 10, 1905.
G. J. HERWIG.
POCKET KNIFE.
APPLICATION FILED FEB. 10, 1905.
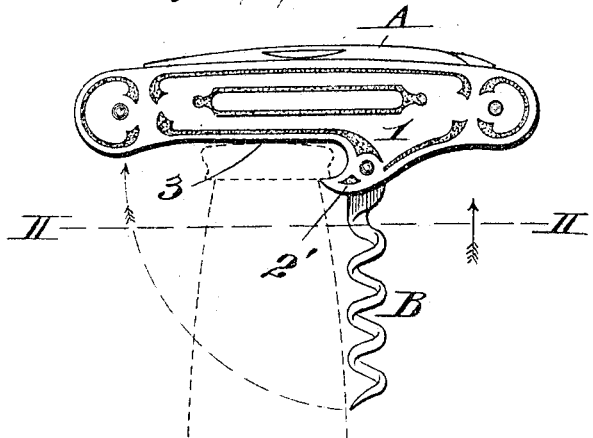
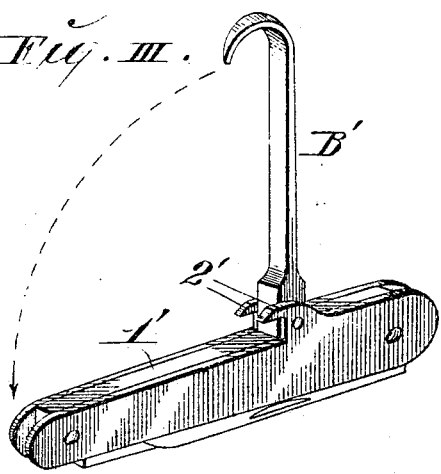 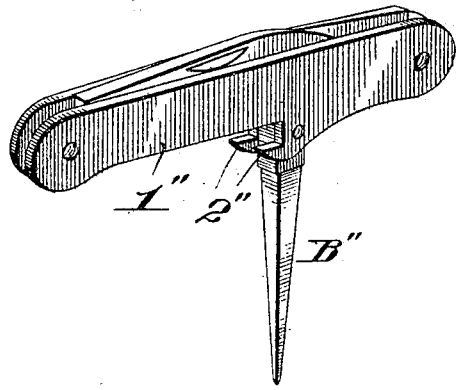
Attest:
W. P. Smith,
Blanche Hogan.
Inventor:—
George J. Herwig.
By Wright Bro
attys.

UNITED STATES PATENT OFFICE.

GEORGE J. HERWIG, OF ST. LOUIS, MISSOURI.

POCKET-KNIFE.

No. 801,791. Specification of Letters Patent. Patented Oct. 10, 1905.

Application filed February 10, 1905. Serial No. 245,036.

*To all whom it may concern:*

Be it known that I, GEORGE J. HERWIG, a citizen of the United States, residing in the city of St. Louis, in the State of Missouri, have invented certain new and useful Improvements in Pocket-Knives, of which the following is a full, clear, and exact description, reference being had to the accompanying drawings, forming part of this specification.

My invention relates to an improvement in pocket-knives, and has for its object to provide, in connection with a knife of the type named, means by which bottle-caps, commonly known as "crown-caps," may be readily removed from the necks of bottles.

Figure I is a side view of a knife constructed in accordance with my improvement and illustrated as applied to a bottle-cap. Fig. II is an edge view of the knife, partly in section, taken on line II II, Fig. I. Fig. III is a perspective view of my knife with an implement shown in connection therewith in lieu of the implement shown in Figs. I and II. Fig. IV is a perspective view of my knife with an implement shown in connection therewith in lieu of the implements shown in Figs. I to III, inclusive.

1 designates the handle of my knife, in which is mounted one or more blades A. At the back of the handle 1 is a pair of prongs 2, that extend longitudinally of the handle and project rearwardly, so that their points are separated from a flat seat-surface 3 at the back of the handle. The seat-surface 3 is adapted to be laid flatly against the top side of a bottle-cap, as seen in Fig. I, and when put in such position the points of the prongs 2 are engaged beneath the edge of the cap, so that when the knife-handle is tilted a prying effect is secured upon the bottle-cap to extract it from the neck of the bottle to which it was previously fitted.

The prongs 2 serve the additional function of providing ears within which an implement of any desirable description may be pivotally mounted for utility in connection with my knife. In Figs. I and II, I have shown a corkscrew B as such implement. In Fig. III, I have shown the implement referred to as a hoof-cleaner (indicated by B') and mounted between the prongs 2' of the knife-handle 1'. In Fig. IV, I have shown the implement referred to in the form of a punch B", pivotally mounted between the prongs 2" of the knife-handle 1". It is obvious that other implements than those shown might also be used in lieu of the ones illustrated. Not only do the prongs 2 serve as a bearing for the implement, but the implement in turn acts when closed as a guard to the prongs and keeps the prongs from tearing the pocket or injuring the hand of the user, notwithstanding the fact that the prongs project from the back of the handle to a sufficient extent to engage a bottle-cap to be removed thereby.

I claim as my invention—

A handle member having at its back a pair of prongs extending longitudinally of the member, and an implement pivotally mounted between said prongs and which acts as a guard to the prongs when closed, substantially as set forth.

GEORGE J. HERWIG.

In presence of—
 BLANCHE HOGAN,
 NELLIE V. ALEXANDER.